United States Patent
Roehrl et al.

(10) Patent No.: US 10,082,170 B2
(45) Date of Patent: Sep. 25, 2018

(54) FASTENING DEVICE FOR FASTENING A STRUCTURAL PART CONSISTING OF A CARBON-FIBER-REINFORCED PLASTIC TO A COMPONENT, IN PARTICULAR A CHASSIS COMPONENT OF A VEHICLE

(71) Applicants: Sabine Roehrl, Germering (DE);
Thomas Weiss, Feldafing (DE);
Ferdinand Dirschmid, Ottobrunn (DE);
Anton Gruber, Puchheim (DE);
Johann Kettenberger, Winhoering (DE)

(72) Inventors: Sabine Roehrl, Germering (DE);
Thomas Weiss, Feldafing (DE);
Ferdinand Dirschmid, Ottobrunn (DE);
Anton Gruber, Puchheim (DE);
Johann Kettenberger, Winhoering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 139 days.

(21) Appl. No.: 14/743,275

(22) Filed: Jun. 18, 2015

(65) Prior Publication Data
US 2015/0285290 A1    Oct. 8, 2015

Related U.S. Application Data

(63) Continuation of application No. PCT/EP2013/075968, filed on Dec. 9, 2013.

(30) Foreign Application Priority Data

Dec. 19, 2012    (DE) .......................... 10 2012 223 863

(51) Int. Cl.
*F16B 5/02*    (2006.01)
*F15B 11/00*    (2006.01)
(Continued)

(52) U.S. Cl.
CPC .......... *F16B 35/005* (2013.01); *B62D 27/026* (2013.01); *B62D 27/065* (2013.01);
(Continued)

(58) Field of Classification Search
CPC ............. F16B 5/01; F16B 5/02; F16B 11/006
(Continued)

(56) References Cited

U.S. PATENT DOCUMENTS 4,010,519 A * 3/1977 Worthing ................ F16B 19/10
24/67 CF
4,448,565 A * 5/1984 Peterson .................... F16B 5/02
403/408.1

(Continued)

FOREIGN PATENT DOCUMENTS

DE    32 02 594 A1    8/1983
DE    689 28 342 T2    1/1998
(Continued)

OTHER PUBLICATIONS

Translation of JP 2009-204159, Sep. 2009.*
(Continued)

*Primary Examiner* — Flemming Saether
(74) *Attorney, Agent, or Firm* — Crowell & Moring LLP

(57) ABSTRACT

A fastening device is provided for fastening a structural part consisting of a carbon-fiber reinforced plastic, in particular a cell of a vehicle, to a component, in particular a chassis component of a vehicle. In order to provide a fastening device which ensures a secure fastening of structural parts consisting of a carbon fiber-reinforced plastic to other vehicle components, a first connecting element is mounted on the structural part, on which first connecting element a second connecting element can be mounted. The first connecting element is connected to the structural part by an adhesive layer and has a protruding bush which passes
(Continued)

through a bore in the structural part and which projects with its free end beyond the structural part.

10 Claims, 3 Drawing Sheets

(51) Int. Cl.
*F16B 35/00* (2006.01)
*B62D 27/02* (2006.01)
*B62D 27/06* (2006.01)
*B62D 29/04* (2006.01)
*F16B 11/00* (2006.01)
*F16B 25/00* (2006.01)

(52) U.S. Cl.
CPC .............. *B62D 29/048* (2013.01); *F16B 5/02* (2013.01); *F16B 11/006* (2013.01); *F16B 25/0015* (2013.01)

(58) Field of Classification Search
USPC ........................................................ 411/82
See application file for complete search history.

(56) References Cited

U.S. PATENT DOCUMENTS

| | | | |
|---|---|---|---|
| 4,475,765 A | 10/1984 | Vogt et al. | |
| 4,878,795 A * | 11/1989 | Woodrow | F16B 5/01 411/183 |
| 4,981,735 A * | 1/1991 | Rickson | F16B 5/01 156/92 |
| 5,060,975 A | 10/1991 | Sano et al. | |
| 7,819,452 B2 * | 10/2010 | Fuchs | B23K 11/11 156/60 |
| 7,891,073 B2 * | 2/2011 | Blanchard | F16B 5/01 228/101 |
| 8,047,593 B2 | 11/2011 | Fuchs et al. | |
| 2009/0278371 A1 | 11/2009 | Fuchs et al. | |
| 2012/0248821 A1 | 10/2012 | Schmied et al. | |
| 2012/0313399 A1 | 12/2012 | Caliskan et al. | |
| 2013/0122246 A1 * | 5/2013 | Berger | F16B 5/08 428/119 |
| 2014/0321941 A1 * | 10/2014 | Hufenbach | F16B 5/01 411/337 |
| 2015/0016871 A1 * | 1/2015 | Sugimoto | F16B 5/08 403/271 |
| 2015/0322993 A1 * | 11/2015 | Brewer | F16B 37/12 411/82 |
| 2016/0339630 A1 * | 11/2016 | Ogawa | B29C 65/4835 |

FOREIGN PATENT DOCUMENTS

| | | |
|---|---|---|
| DE | 10 2005 024 263 A1 | 12/2006 |
| DE | 10 2009 023 032 A1 | 12/2010 |
| DE | 10 2009 050 990 A1 | 5/2011 |
| DE | 10 2011 107 237 A1 | 5/2012 |
| DE | 10 2012 208 622 A1 | 12/2012 |
| DE | 10 2012 220 333 A1 | 5/2013 |
| JP | 2009-204159 * | 9/2009 |

OTHER PUBLICATIONS

German Search Report dated Jun. 24, 2013 with partial English-language translation (ten (10) pages).
International Search Report (PCT/ISA/210) dated Feb. 28, 2014 with English-language translation (four (4) pages).

* cited by examiner

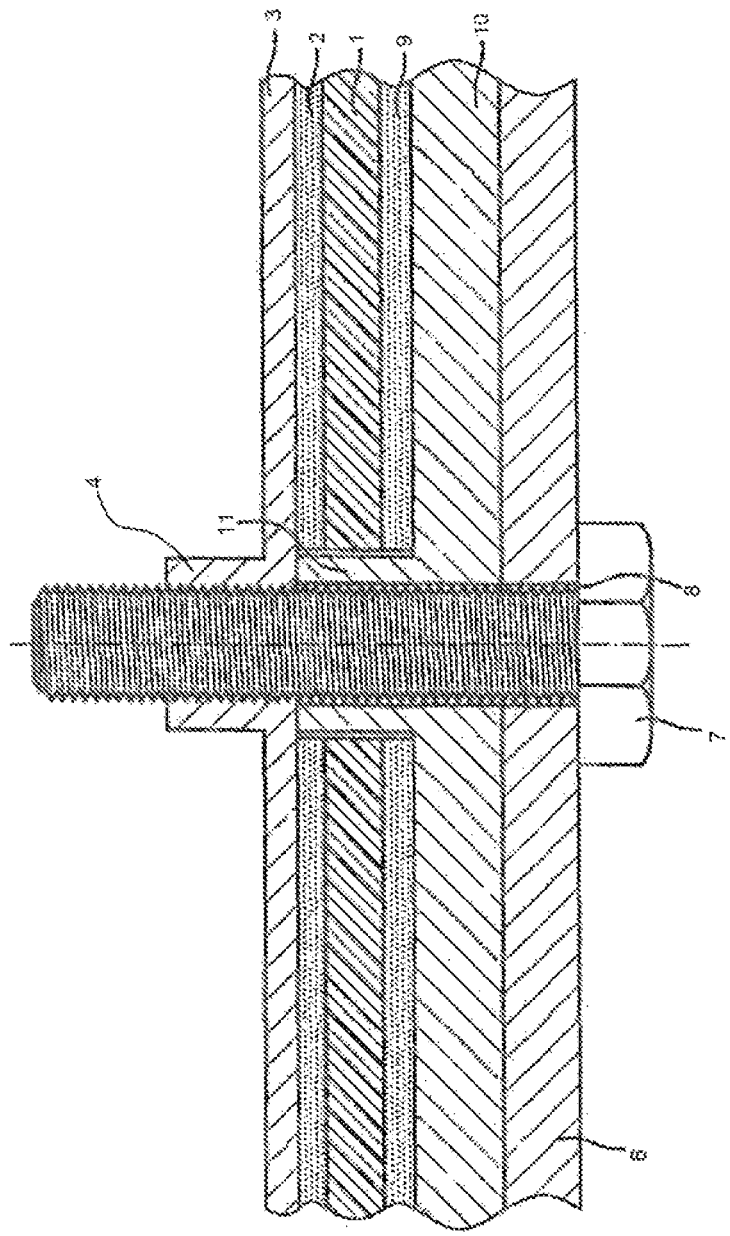

FASTENING DEVICE FOR FASTENING A STRUCTURAL PART CONSISTING OF A CARBON-FIBER-REINFORCED PLASTIC TO A COMPONENT, IN PARTICULAR A CHASSIS COMPONENT OF A VEHICLE

CROSS REFERENCE TO RELATED APPLICATIONS

This application is a continuation of PCT International Application No. PCT/EP2013/075968, filed Dec. 9, 2013, which claims priority under 35 U.S.C. § 119 from German Patent Application No. 10 2012 223 863.8, filed Dec. 19, 2012, the entire disclosures of which are herein expressly incorporated by reference.

BACKGROUND AND SUMMARY OF THE INVENTION

The present invention relates to a fastening device for a structural part made of a carbon fiber-reinforced plastic to a component, in particular a chassis component of a vehicle.

In vehicle construction, structural parts made of carbon fiber-reinforced plastic are increasingly used when high weight-specific strengths and stiffnesses are required. Sometimes even entire vehicle components, such as the cell of a vehicle, for example, are made partially or entirely of carbon fiber-reinforced plastic. However, connecting these structural parts or components made of carbon fiber-reinforced plastic to other components, in particular a chassis component of a vehicle, is problematic because under pressure, carbon fiber-reinforced plastic exhibits a settlement behavior that negatively influences a safe connection to other components.

Therefore, the object of the present invention is to provide a fastening device that guarantees a safe and high-strength fastening of structural parts made of a carbon fiber-reinforced plastic to other vehicle components. The structural part may, in particular, also be a vehicle component, so that the object of the invention is in particular to provide a fastening device that guarantees a safe and high-strength connection of two vehicle components, with at least one vehicle component being made of a carbon fiber-reinforced plastic.

With a device for fastening a structural part consisting of a carbon fiber-reinforced plastic, in particular a vehicle cell or a load-bearing structural vehicle body part, to a component, in particular a chassis component of a vehicle or a motor vehicle, this object is achieved according to the invention in that a first connecting element is affixed at the structural part, to which a second connecting element can be affixed. The first connecting element is connected to the structural part by an adhesive layer and has a protruding bush that reaches through a bore in the structural part and protrudes with one free end beyond the structural part.

Alternately, with a fastening device for a structural part consisting of a carbon fiber-reinforced plastic, in particular a vehicle cell or a load-bearing structural vehicle body part, to a component, in particular a chassis component of a vehicle or a motor vehicle, the object of the invention is achieved in accordance with the invention in that a first connecting element is affixed at the structural part, to which a second connecting element can be affixed. The first connecting element is connected to the structural part by an adhesive layer. Furthermore, a third connecting element bears against the component and the structural part is positioned between the first connecting element and the third connecting element. The third connecting element has a protruding bush that reaches through a bore in the structural part and protrudes with its free end beyond the structural part.

Because of this design in accordance with the invention, a fastening device is provided where the structural part made of carbon fiber-reinforced plastic is not clamped since the structural part is held at the first connecting element merely by the adhesive layer. This prevents any settlement behavior. Furthermore, high-strength and detachable screw connections can be realized, which are cost efficient and can be produced in high piece numbers.

According to a preferred further development, the first connecting element has an internal thread and the second connecting element has a setscrew.

According to a first embodiment, the bush bears against the component, and the structural part is positioned between the component and the first connecting element. This embodiment guarantees the transmission of relatively tensile forces at a relatively easy setup.

According to a preferred further development, not only is the first connecting element connected to the structural part by an adhesive layer, but rather, the structural part can be advantageously also glued to the component by an adhesive. This results in a particularly firm and safe connection between the structural part and the component, which can also transmit high lateral and/or pressure forces.

Preferably, the third connecting element bears against the free end of the bush. Alternately, the third connecting element preferably comprises a tube that reaches through the opening of the structural part and bears against the first connecting element.

Furthermore, according to an advantageous further development, the structural part can also be glued to the third connecting element by an adhesive.

Advantageously, the third connecting element has the same shape as the first connecting element, with the third connecting element not being able to be coupled mechanically to the second connecting element, in particular therefore not comprising an internal thread.

With this embodiment, high lateral forces (across large adhesive surfaces) as well as high tensile and pressure forces can be transmitted. Furthermore, in this embodiment, the connection between structural part and component is easy to detach.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 illustrates a third embodiment of a fastening device according to the invention.

DETAILED DESCRIPTION OF THE DRAWINGS

The figures show only the parts of the fastening device that are of interest here. All other parts have been omitted for the sake of clarity.

Figure 1:
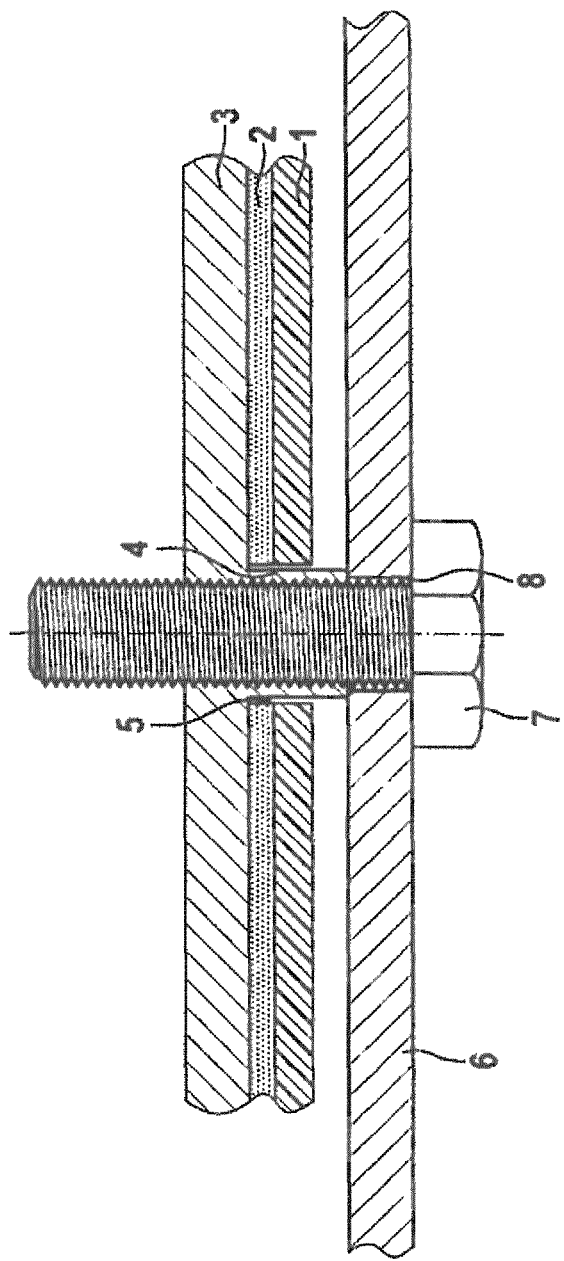
FIG. 1 illustrates a first embodiment of a fastening device according to the invention.

FIG. 1 shows a first embodiment of the fastening device according to the invention; it has a simple structure and can transmit high tensile forces.

A structural part 1 (CFK structural part) consisting of a carbon fiber-reinforced plastic, such as a CFK cell or a load-bearing body part of a vehicle, for example, is glued to a first connecting element 3 via an adhesive layer 2. The first connecting element 3 has a protruding bush 4, which can be formed in a single (one) piece with the first connecting element 3. When viewed in cross-section, the connecting element 3 and the bush 4 form the form of a "T", with the connecting element 3 forming the horizontal and the bush 4 forming the vertical leg of the "T".

The bush 4 of the first connecting element 3 extends through a bore 5 in the structural part 1 and protrudes with its free end beyond the structural part 1 on the side facing away from the first connecting element 3.

To connect the structural part 3 to a component 6, which for example may be a chassis component of the vehicle, a second connecting element 7 is provided. The second connecting element 7 extends through a bore 8 in the component 6 and can be connected to the first connecting element 3. In this condition, the component 6 is supported at the bush 4. Because the bush 4 protrudes beyond the structural part 1, no clamping forces can be transmitted to the structural part 1, which is connected to the fastening device according to the invention exclusively via the adhesive layer 2.

For example, the first connecting element 3 can be a screw nut with an interior screw thread, and the second connecting element 7 can be a setscrew that can be screwed into the screw nut, in particular a screw.

Figure 2:
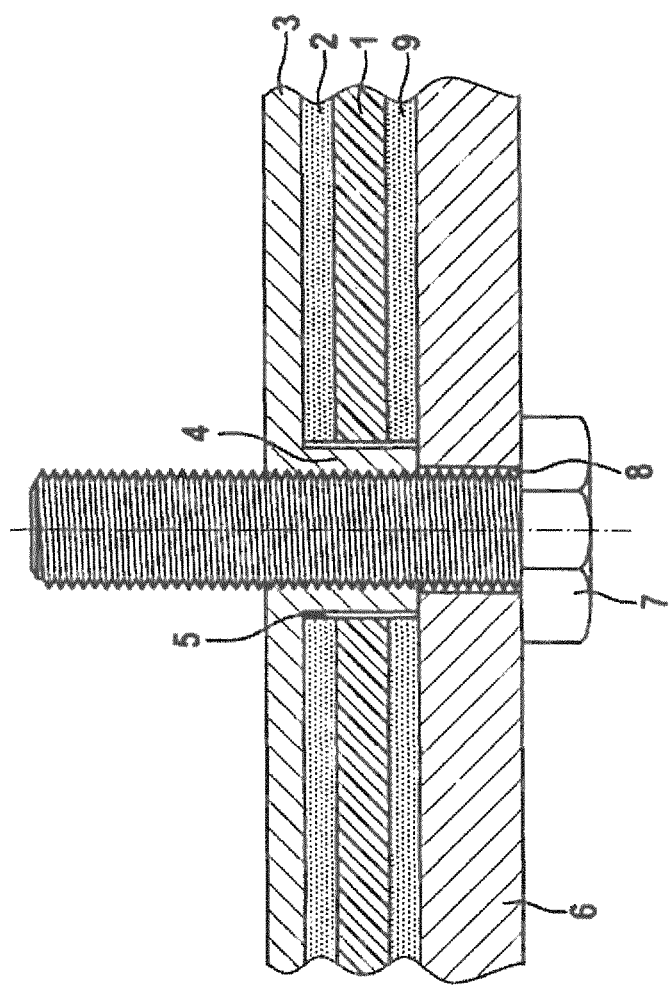
FIG. 2 illustrates a second embodiment of a fastening device according to the invention.

FIG. 2 shows a second embodiment of the fastening device according to the invention, which can transmit high lateral forces as well as high tensile and pressure forces.

This embodiment is different from the first embodiment in that the structural part 1 is additionally connected to the component 6 via an adhesive 9, which makes it possible to transmit high lateral forces because of the relatively large adhesive surfaces 2 and 9. The structural part 1 is therefore glued on one side to the first connecting element 3 and on the other side to the component 6.

FIG. 3 shows a third embodiment of the fastening device according to the invention, which can transmit high lateral forces as well as high tensile and pressure forces.

In this embodiment as well, the structural part 1, which consists of a carbon fiber-reinforced plastic (CFK structural part), is glued to the first connecting element 3 via the adhesive layer 2. The first connecting element 3 has the same shape as the first embodiment shown in FIG. 1. However, here the bush 4 protrudes away from the structural component 1.

The second connecting element 7 is also used in this embodiment to connect the structural part 3 to the component 6. The second connecting element 7 extends through the bore 8 in the component 6 and can be connected to the first connecting element 3. Unlike in the first embodiment, where the component 6 is supported at the bush 4, in the present embodiment of FIG. 3, the component 6 is supported at a third connecting element 10. Because of this arrangement, a tube 11 is located at the side of the third connecting element 10 that faces away from the component 6 and extends through and protrudes beyond the structural part 1 there. The first connecting element 3 bears against said protruding tube 11. The tube 11 can be, in particular, formed in a single (one) piece with the third connecting element 10.

In cross-section, the third connecting element 10 has the same shape as the first connecting element 3 and is also connected to the structural part 1 by an adhesive 9. Consequently, the structural part 1 is glued to the first connecting element 3 on one side, and to the third connecting element 10 on the other side. Unlike the first connecting element 3, the third connecting element 10 is merely a spacing element and not a fastening element. Therefore, the third connecting element 10 in particular does not have an internal thread.

Instead of the way it was described and is shown in the figures, the bush 4 can also be arranged at the component 6 instead of at the first connecting element 3, or it can be developed as a separate structural part. Likewise, the tube 11 can also be provided as a separate structural part instead of at the third connecting element 10.

The fastening device according to the invention facilities a high-strength connection, in particular of a CFK structural part to a component, and it can be realized in a cost-efficient and space-saving manner.

The description above of the present invention is merely for illustrative purposes and not for the purpose of limiting the invention. In the scope of the invention, various changes and modifications are possible without leaving the scope of the invention as well as its equivalents.

LIST OF REFERENCE SYMBOLS

1 Structural part
2 Adhesive layer
3 First connecting element
4 Bush
5 Bore
6 Component
7 Second connecting element
8 Bore
9 Adhesive
10 Third connecting element
11 Tube The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fastening device for a carbon fiber-reinforced plastic structural part to be fastened to a vehicle chassis, consisting essentially of:
    a first connecting element;
    a second connecting element;
    a first adhesive layer affixing the first connecting element to the carbon fiber-reinforced plastic structural part,
    a second adhesive layer that directly adheres the vehicle chassis to the carbon fiber-reinforced structural part, wherein
    the first connecting element includes a protruding bush that extends through a bore in the carbon fiber-reinforced plastic structural part with a free end extending beyond the carbon fiber-reinforced plastic structural part,
    the second connecting element is fixed to the first connecting element, and
    the first connecting element includes a thread and the second connecting element is a threaded fastener.

2. The fastening device according to claim 1, wherein the carbon fiber-reinforced plastic structural part is a cell of a motor vehicle.

3. The fastening device according to claim 1, wherein the carbon fiber-reinforced plastic structural part is a load-bearing vehicle body part.

4. The fastening device according to claim 1, wherein the first connecting element includes an internal thread and the second connecting element is a setscrew.

5. The fastening device according to claim 1, wherein the bush is arranged to bear against the vehicle chassis, and the structural part is positioned between the vehicle chassis component and the first connecting element.

6. A connection in a vehicle, consisting essentially of:
a carbon fiber-reinforced plastic structural part;
a vehicle chassis;
a first connecting element;
a second connecting element;
a first adhesive layer affixing the first connecting element to the carbon fiber-reinforced plastic structural part;
a second adhesive layer affixing the vehicle chassis to the carbon fiber-reinforced structural part, wherein
the first connecting element includes a protruding bush that extends through a bore in the carbon fiber-reinforced plastic structural part with a free end extending beyond the carbon fiber-reinforced plastic structural part,
the second connecting element is fixed to the first connecting element, and
the first connecting element includes a thread and the second connecting element is a threaded fastener.

7. The connection according to claim 6, wherein the carbon fiber-reinforced plastic structural part is a cell of a motor vehicle.

8. The connection according to claim 6, wherein the carbon fiber-reinforced plastic structural part is a load-bearing vehicle body part.

9. The connection according to claim 6, wherein the first connecting element includes an internal thread and the second connecting element is a setscrew.

10. The connection according to claim 6, wherein the bush is arranged to bear against the vehicle chassis, and the structural part is positioned between the vehicle chassis component and the first connecting element.

\* \* \* \* \*